Patented Sept. 6, 1949

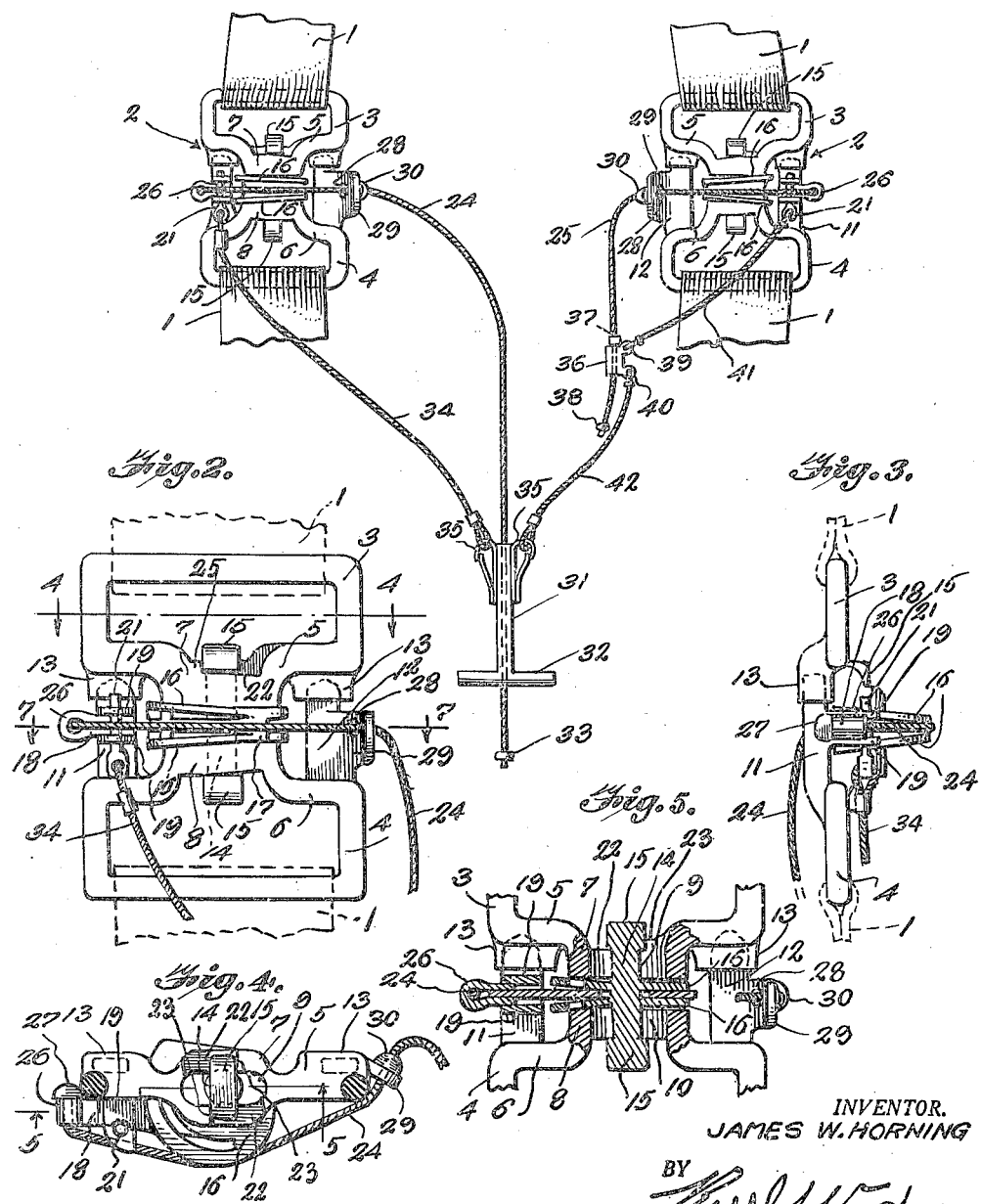

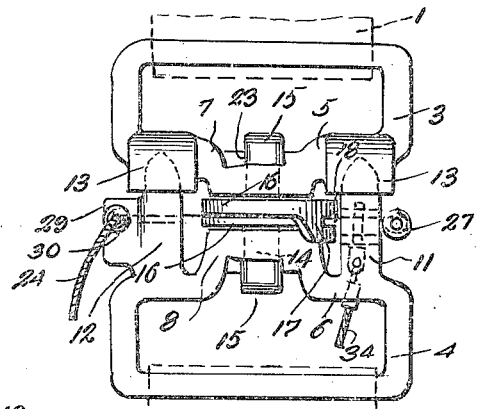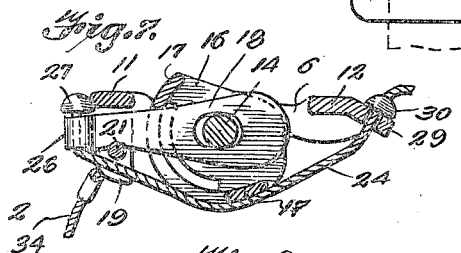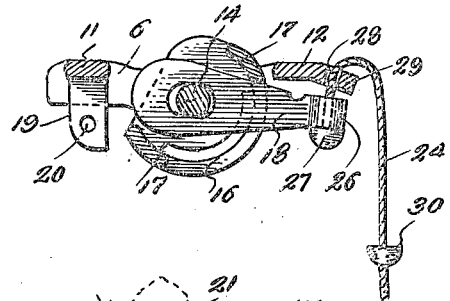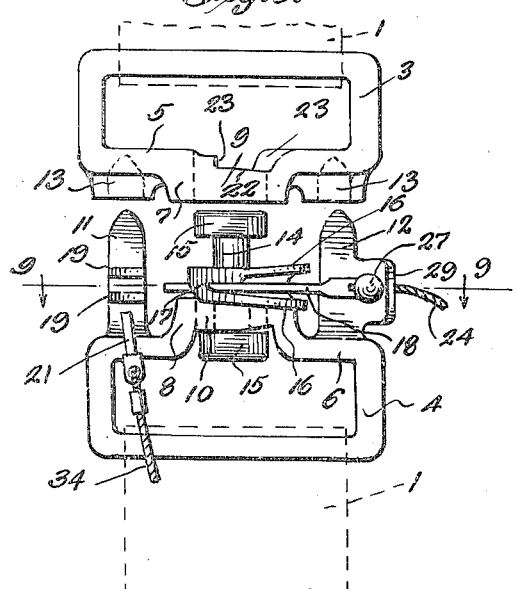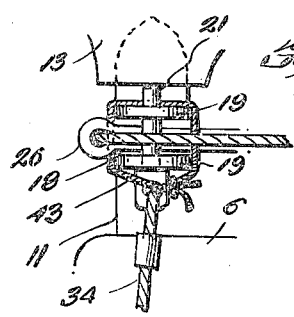

2,481,116

UNITED STATES PATENT OFFICE 2,481,116

PARACHUTE CANOPY RELEASE DEVICE

James W. Horning, Bloomsburg, Pa.

Application January 23, 1947, Serial No. 723,871

10 Claims. (Cl. 244—151)

1

This invention relates to parachutes and more particularly to an improved buckle by means of which the canopy of a parachute may be released and thus allow a person making a jump to free himself from the canopy without discarding the parachute harness. It will thus be seen that when a soldier is on a military mission and is carrying various articles attached to his parachute harness he may release the canopy after making a landing and continue wearing the harness as long as necessary.

Another object of the invention is to provide a quick release device for a parachute canopy which serves as a connection between front and rear portions of the lift webs or risers, improved means being provided for securely connecting the upper portion of a release device with the companion lower portion but allowing the upper portion to be easily and quickly detached from the lower portion as the aviator makes a landing.

Another object of the invention is to mount a connecting pin for the two sections that it may be quickly turned to a released position by pull exerted upon a strand of wire within easy reach of the aviator wearing the harness.

Another object of the invention is to provide a device of this character wherein the pin carries a lever to which the pull line or wire strand is attached and also carries a guide for controlling movement of the pull line during movement of the pin to a releasing position.

Another object of the invention is to provide the quick release with a securing pin for the lever, the securing pin having a pull line or wire strand so associated with the pull line for the lever that when the aviator exerts pull upon a hand hold the securing pin will first be withdrawn and the coupling pin then turned to a releasing position.

Another object of the invention is to provide a quick release buckle having upper and lower sections so formed that when they are connected with each other they will be prevented from turning relative to each other, the upper sections when released having a direct vertical movement out of engagement with the lower sections without likelihood of catching and failing to quickly move out of engagement with the lower sections.

Another object of the invention is to provide a quick release buckle formed of companion sections which are of simple construction and releasably held together by a coupling pin which is also simple in construction and so mounted

2 that it will remain in engagement with the lower section of the buckle when moved into position to release the upper buckle section.

Another object of the invention is to provide a quick release buckle of such construction that it may be applied to the lift web or riser of a parachute harness of conventional construction.

The invention is illustrated in the accompanying drawings wherein:

Fig. 1 is a front view showing the improved quick release buckles and the pull lines for withdrawing their latch pins and moving the couplings to a releasing position.

Fig. 2 is a front view showing a quick release buckle of the improved construction upon an enlarged scale.

Fig. 3 is a side view of the improved quick release buckle.

Fig. 4 is a sectional view taken along the line 4—4 of Figure 2.

Fig. 5 is a sectional view taken along the line 5—5 of Figure 4.

Fig. 6 is a rear view of the quick release buckle.

Fig. 7 is a sectional view taken along the line 7—7 of Figure 2.

Fig. 8 is a front view showing the upper section of the buckle released and withdrawn from the companion lower buckle section.

Fig. 9 is a sectional view taken along the line 9—9 of Figure 8.

Fig. 10 is a fragmentary view showing the manner in which the latch pin is secured against accidental displacement.

A harness for a parachute has lift webs 1 which fit across the shoulders of a person wearing the harness with rear portions of the lift webs of risers extending downwardly from the shoulders with their lower ends connected with the parachute pack. When the rip cord is pulled the pack is released and the rear portions of the lift webs are carried upwardly so that they extend upwardly from the harness in such position that the aviator will be suspended under the canopy of the parachute. The harness is of such construction that when a landing is made it may be released while still connected with the canopy as the aviator steps out of the harness. Such a harness has been unsatisfactory for some operations as in some cases the aviator wishes to carry certain articles with him when he lands and if they are secured to the harness they will be carried away with the harness. It has also been found that in some instances the aviator does not release the harness soon enough and will be dragged along the ground or through water and be injured or drowned.

In order to overcome these objections and permit the canopy to be released without removing the harness from the aviator the improved quick release buckles constituting the subject matter of this invention have been provided. These buckles, which are indicated in general by the numeral 2 are applied to the harness by cutting the lift webs near the shoulder portions of the harness and inserting the buckles between the front and rear portions of the lift webs at approximately the locations occupied by the adapter rings of the harness.

The buckles are of duplicate construction and each has an upper section or ring 3 and a companion lower section or ring 4. The two rings have their inner cross bars 5 and 6 formed with necks 7 and 8 through which openings 9 and 10 are formed, and referring to Figure 5 it will be seen that the openings are elongated longitudinally of the cross bars 5 and 6 and the opening 10 has constructed end portions. Posts 11 and 12 which are integral with the cross bar 6 of the ring 3 extend upwardly from opposite end portions thereof and have their upper ends tapered so that they may fit easily into sockets 13 extending downwardly from end portions of the cross bar 5 of the ring 4. The posts serve as stops to prevent the two rings from having turning movement relative to each other and the front and rear portions of the lift webs will therefore be prevented from becoming twisted.

In order to releasably hold the two rings or sections 3 and 4 in engagement with each other with their necks in alignment there has been provided a coupling pin 14 which passes through the two necks 7 and 8 and is formed at its upper and lower ends with heads 15 which are of oblong shape so that they are of greater length than width, as shown in Figures 4 and 8. The coupling pin carries discs or collars 16 connected by circumferentially spaced webs 17 and since the collars are fixed to the coupling pin turning movement imparted to these discs will cause the pin to be turned from a position transversely of the openings 9 and 10 to a position longitudinally thereof. When the heads extend transversely of the slots or openings in the necks the two rings or sections 3 and will be held in engagement with each other, and when the pin is turned to a position presenting its heads longitudinally of the openings it will be in a releasing position and the sections or rings may be separated, as shown in Figure 8. Separation of the rings will release the rear or upper portions of the lift webs from the forward or lower portions thereof and the canopy of the parachute will be freed from the harness and may be carried away by wind without disturbing the harness which will remain in place upon the aviator.

Turning of the coupling pin from the securing position to a releasing position is accomplished by means of a lever 18 which is rotatably mounted about the coupling pin between the discs 16 and is of such length that when the pin is in the securing position the outer or free end portion of the lever will fit between arms 19 which project laterally from the post 11 and are formed with aligned openings 20 to receive a retainer pin or keeper 21. When the keeper is withdrawn the lever may be swung about the coupling pin until it has abutting engagement with one of the webs 17 and continued movement of the lever will turn the discs 16 and the coupling pin from the securing position shown in Figure 4 to the releasing position shown in Figure 8. The head at the upper end of the coupling pin fits into recesses 22 formed in opposite sides of the neck 9 of the upper ring and having shoulders 23 at their ends to limit turning of the coupling pin when moved to the securing position. Pull lines 24 and 25 which may be formed of twisted wire or other suitable material are mounted through eyes 26 at the free ends of the levers and carry knobs 27 for engagement with the eyes. These pull lines are threaded through openings 28 formed in ears 29 which project laterally from the posts 12 and carry stops 30 for limiting movement of the lines through the ears in one direction. The pull lines pass between flared portions of the discs 16 and when pull is exerted upon these lines to swing the levers and turn the coupling pins the flared portions of the discs serve as guides for the pull lines. A sleeve 31 fits loosely about the pull line 24 and carries a cross head 32 at its lower end so that the sleeve may be conveniently grasped and pulled downwardly until the stop 33 at the lower end of the pull line is engaged by the lower end of the sleeve and downward pull exerted upon the pull line. As the sleeve is pulled downwardly a pull line 34 attached to the keeper pin 21 of the buckle from which the line 24 extends and having its lower end engaged with one of the hooks 35 carried by the sleeve will be pulled downwardly and the keeper pin withdrawn from the arms 19. Removal of the keeper pin takes place just before the lower end of the sleeve engages the stop 33 and the lever will then be pulled upon and swung to move the coupling pin to the releasing position. The pull line for the other buckle passes through a short sleeve 36 and carries abutments 37 and 38. Upper and lower eyes 39 and 40 project laterally from the sleeve 39 and to the upper eye is attached the lower end of the pull line 41 for the keeper pin of the other buckle. A line 42 has its upper end connected with the lower eye 40 of the sleeve 36 and its lower end engaged with the second hook of the sleeve 31 and when the sleeve 31 is pulled downwardly the keeper pins of both buckles will be withdrawn and the two levers then moved to turn the coupling pins to a releasing position. It will thus be seen that the upper section of both buckles may be simultaneously released from their companion lower sections or rings. When a landing is made upon water it is important that both of the lift webs be released but when a landing is made upon the ground it is only necessary to release one of the lift webs. Therefore, if so desired, the aviator may detach the eye at the lower end of the pull line 42 from the hook of the sleeve 31 and downward pull upon the sleeve 31 will then only release the upper section of ring of one of the buckles. In order to prevent the keeper pins from accidentally slipping downwardly out of the opening formed in the arms 19 a string 43 is passed through the eye at the lower end of each pin and tied about the arms as shown in Figure 10. This string is strong enough to prevent the pins from accidentally slipping downwardly through the openings in the arms but when pull is exerted upon the sleeve 31 and the pull lines 34 and 42 the strings will be broken and allow withdrawal of the pins.

Having thus described the invention, what is claimed is:

1. In a parachute harness, lift webs having front and rear sections, quick release devices interposed between the front and rear sections of the lift webs and each having separable upper and lower rings carried by the said sections of the lift webs and formed at inner ends with aligned openings, a fastener passing vertically through the aligned openings of the companion upper and lower rings and rotatably mounted for movement from a securing position to a releasing position, and means operatable by a person wearing the parachute harness for turning the pins to the releasing position.

2. In a parachute harness, lift webs having front and rear sections, quick release devices interposed between the front and rear sections of the lift webs and having separable upper and lower companion rings carried by the said sections of the lift webs, couplings for passing through the companion upper and lower rings movable from a securing position to a releasing position, levers carried by said couplings for turning the couplings to a releasing position and to a securing position, keepers for engaging the levers and releasably securing the levers in position to hold the couplings in a securing position, and means adapted to be operated by a person wearing the harness for moving the keepers to a releasing position and then imparting movement to the levers for moving the couplings to a releasing position.

3. In a parachute harness, lift webs having front and rear sections, quick release devices interposed between the front and rear sections of the lift webs and having separable upper and lower rings carried by the said sections of the lift webs, couplings releasably connecting the companion upper and lower rings and movable from a securing position to a releasing position, levers extending from the couplings for moving the couplings to a releasing position, pins removably mounted in position for extending across the levers and releasably holding the levers in a set position with the couplings in a securing position, pull lines connected with said levers, sleeves about said pull lines, pull lines connecting the sleeves with the securing pins and serving to withdraw the securing pins when the sleeves are pulled downwardly by a person wearing the parachute harness, and abutments carried by the first mentioned pull lines and engageable by the sleeves to cause downward pull to move the couplings to a releasing position after the securing pins have been withdrawn.

4. In a parachute harness, lift webs having front and rear portions, quick release devices interposed between the front and rear sections of the lift webs and having separable upper and lower rings carried by the said sections of the lift webs, couplings for the companion upper and lower rings movable from a securing position holding the rings together to a releasing position, levers movable into and out of position for extending across portions of the levers and moving the couplings to a releasing position, pins for releasably holding the levers in a set position with the couplings in a securing position, pull lines connected with said levers, sleeves about said pull lines, pull lines connected with the securing pins for withdrawing the securing pins when subjected to downward pull, the sleeve about the pull line for one lever having hooks at its upper end and a hand hold at its lower end, the pull line for one securing pin being detachably engaged with one of said hooks, a line carried by the other sleeve and detachably engaged with the second hook of the first sleeve, the pull line for the other securing pin being connected with the second sleeve, and abutments carried by the pull lines for the levers disposed in position for engagement by lower ends of the sleeves for exerting downward pull upon the pull lines for the levers and for moving the levers in a direction to move the couplings to a releasing position after the securing pins have been withdrawn.

5. A quick release device for detachably connecting a rear section of the lift web of a parachute harness with a front section thereof, said release device comprising upper and lower web-engaging sections formed with aligned openings, a rotatable coupling pin passing vertically through the aligned openings and having a head at its upper end for overlapping portions of the upper section and at opposite sides of the openings therein releasably connecting the sections in engagement with each other when the coupling pin is turned to a securing position, members carried by one section for engaging the other section and preventing turning of the said sections relative to each other, a lever carried by said coupling pin imparting turning movement to the coupling pin, a pin carried by one section and movable into and out of position for extending across the lever and releasably holding the lever in a set position for holding the coupling in a securing position, and means for moving the securing pin to a releasing position and then swinging the lever into position for turning the coupling pin to a releasing position and thereby allowing separation of the said upper and lower sections of the release device.

6. A quick release device for connecting sections of a lift web of parachute harness, said device comprising upper and lower sections having cross bars formed with aligned openings, a coupling pin rotatably passing through said openings and having a head at its upper end to overlap portions of the cross bar of the upper section at opposite sides of the opening therein and releasably hold the sections together when the coupling pin is turned to a securing position, a collar about the coupling pin rotatably mounting the said pin and having upper and lower discs connected by spaced abutment webs and bent away from each other between the webs to form a slot between the abutments, a lever loosely mounted about the coupling pin and extending laterally therefrom through the space between the webs, posts extending upwardly from the cross bar of the lower section and removably fitting into sockets formed in the cross bar of the upper section to prevent turning of the sections relative to each other, perforated arms projecting horizontally from one post in vertical spaced relation to each other and between which said lever fits when moved to a set position for holding the coupling pin in a horizontal securing position, a tongue projecting laterally from the other post and formed with an opening, a pull line connected with the free end of said lever and threaded through the opening of said tongue with a portion fitting into the slot of the collar, a securing pin removably passed vertically through openings in said arms, and a pull line connected with the securing pin for withdrawing the same and allowing the lever to be swung horizontally between the webs of the collar and turn the said coupling pin to a releasing position.

7. A quick release device for connecting sections of a lift web of a parachute harness, said device comprising upper and lower web-engaging rings having cross bars formed with aligned openings, a coupling pin rotatably passing through the openings and having a head at its upper end for overlapping portions of the cross bar of the upper ring and holding the rings together when the coupling pin is turned to a securing position, a lever for turning the coupling pin into and out of a securing position, a securing pin movable into and out of position for holding the lever in a set position for holding the coupling pin in its securing position, and pull lines connected with the securing pin and the lever for moving the securing pin to a releasing position and moving the lever in a direction for moving the coupling pin to a releasing position.

8. A quick release device for connecting sections of a lift web of a parachute harness, said device comprising upper and lower web-engaging rings having cross bars formed with aligned openings, a coupling pin rotatably passing through the openings for turning movement into and out of position to secure the rings together, a collar about said coupling pin rotatably resting upon the cross bar of the lower ring and having circumferentially spaced abutments and a slot about its periphery between the abutments, a lever loosely mounted about the coupling pin and extending radially therefrom and through the slot between the abutments, posts rising from the cross bar of the lower ring and removably fitting into sockets formed in the cross bar of the upper ring, vertically spaced horizontal arms projecting laterally from one post and formed with vertically aligned openings, the arms being in position for movement of the lever into position between them when in its set position, a pin removably fitted through the perforated post for extending across the outer side face of the lever and holding the lever in a set position, a pull line connected with the securing pin for withdrawing the securing pin and releasing the lever, and a pull line connected with the free end of the lever for swinging the lever when released and turning the coupling pin to a position for releasing the ring.

9. A quick release device for connecting sections of a lift web of a parachute harness, said device comprising upper and lower web-engaging rings having cross bars formed with aligned openings, a coupling pin rotatably passing through the openings for turning movement into and out of position to secure the rings together, a collar about said coupling pin rotatably resting upon the cross bar of the lower ring and having circumferentially spaced abutments, a lever loosely mounted about the coupling pin and extending radially therefrom between the abutments for engaging the abutments and moving the coupling pin into and out of a securing position when swung about the coupling pin, a latch for releasably securing the lever in a set position holding the coupling pin in the securing position, and means for moving the latch to a releasing position and then moving the lever in a direction to move the coupling pin to a releasing position.

10. A quick release device for connecting sections of a lift web of a parachute harness, said device comprising upper and lower web-engaging rings having cross bars formed with aligned openings, a coupling pin rotatably passing through the openings for turning movement into and out of position to secure the rings together, a lever extending laterally from said pin for turning the coupling pin into and out of a securing position, a latch movable into and out of position for engaging the lever and releasably holding the lever in a set position to hold the coupling pin in its securing position, and pull lines connected with the latch and the lever.

JAMES W. HORNING.

REFERENCES CITED

The following references are of record in the file of this patent:

UNITED STATES PATENTS

| Number | Name | Date |
|---|---|---|
| 2,105,908 | Dick | Jan. 18, 1938 |
| 2,108,716 | Kuhlemann | Feb. 15, 1938 |
| 2,405,333 | Sheridan | Aug. 6, 1946 |